United States Patent Office 2,762,810
Patented Sept. 11, 1956

2,762,810

PROCESS FOR INTRODUCING A TRICYANOVINYL SUBSTITUENT ON THE RING OF A CYCLIC AMINE

Richard Edwin Heckert, Wilmington, Del., assignor to E. I. du Pont de Nemours and Company, Wilmington, Del., a corporation of Delaware No Drawing. Application September 28, 1953,
Serial No. 382,860

4 Claims. (Cl. 260—283)

This invention relates to the preparation of organic compounds and, more particularly to a process of preparing C-tricyanovinylamines.

The present invention is concerned with the process of preparing compounds having the characteristic grouping $(CN)_2C=C(CN)C$ which are C-tricyanovinylamines, as distinguished from amines having the characteristic grouping $(CN)_2C=C(CN)N$ which are N-tricyanovinylamines. The latter compounds and their preparation are disclosed and claimed in applicant's application Serial No. 382,859, filed of even date herewith and entitled "Nitrogen Compounds and Preparation of Same." Both types of compounds contain the tricyanovinyl group $(CN)_2C=C(CN)$— but in the first instance it is bonded to carbon and in the second to nitrogen.

An object of the present invention is to provide a process of preparing C-tricyanovinylamines. Other objects will be apparent from the description of the invention given hereinafter.

The above objects are accomplished according to the present invention by reacting tetracyanoethylene with select amines as characterized below to form C-tricyanovinylamines.

Tetracyanoethylene, $(CN)_2C=C(CN)_2$, can be prepared by the reaction of sulfur monochloride with malononitrile, conveniently in the presence of an inert liquid diluent, and thereafter separating the tetracyanoethylene formed from the reaction mixture.

It has now been found that tetracyanoethylene will readily react under mild conditions with certain amines to give highly useful C-tricyanovinylamines which are characterized by the grouping $(CN)_2C=C(CN)C$. These C-tricyanovinylamines can be represented by the formula:

$$(CN)_2C=C(CN)C_1[Z]N_1(R_1)x(R_2)y$$

in which $R_1$ and $R_2$ are hydrogen, alkyl or aryl; $x$ and $y$ are cardinal numbers not greater than 1; and Z is an intervening cyclic structure containing three to five anular carbons, in which $C_1$ is a member of the ring and $N_1$ is a member of the ring or directly bonded thereto.

The C-tricyanovinylamines herein considered are prepared by the process of this invention by reacting tetracyanoethylene with any one of the following classes of amines:

1. Primary aromatic amines in which neither of the annular carbons immediately adjacent to the carbon bonded to the amino substituent, is directly bonded to hydrogen or halogen and in which hydrogen is bonded to the annular carbon in the 4-position, the carbon bonded to the amino group being considered in the 1-position.

2. Secondary and tertiary aromatic amines in which hydrogen is bonded to the annular carbon in the 4-position.

3. Heterocyclic amines in which the ring is resonance stabilized and contains at least one carbon bonded to hydrogen and in which only two bonds of the nitrogen are attached to the ring.

Resonance in organic molecules and its effect on their stability is discussed in detail in G. W. Wheland's book "The Theory of Resonance," John Wiley and Sons, New York, 1944.

The reaction of tetracyanoethylene with the amines noted above to form C-tricyanovinylamines takes place by a unique condensation in which the elements of hydrogen cyanide are lost. In the C-tricyanovinylamines formed by the reaction of tetracyanoethylene with the aromatic amines noted above, the tricyanovinyl group becomes attached to the aromatic ring at the 4-position, considering the carbon bonded to the amino group as being in the 1-position. In the C-tricyanovinylamines formed by the reaction of tetracyanoethylene with the heterocyclic amines noted above, when the heterocyclic amine contains more than one annular carbon directly bonded to hydrogen, the tricyanovinyl group replaces preferentially that hydrogen which is the more readily replaced in other alkylation reactions. Thus, pyrrole gives alpha-tricyanovinylpyrrole and alpha,alpha'-dimethylpyrrole gives alpha,alpha'-dimethyl-beta-tricyanovinylpyrrole. The greater reactivity of the alpha-hydrogen over the beta-hydrogen of pyrrole toward alkylation has been noted by A. H. Corwin in "The Chemistry of Pyrrole and its Derivatives" which is chapter 6 in "Heterocyclic compounds," vol I, edited by R. C. Elderfield, John Wiley & Sons, New York, 1950, page 307..

In the reaction of tetracyanoethylene with amines, the above classes of amines have been found limiting for the preparation of C-tricyanovinylamines as the predominant products, since the structure of the amine determines whether the tricyanovinyl group is directed toward attachment to the amino nitrogen or toward attachment to one of the carbon atoms of the amine. In applicant's application Serial No. 382,859, filed of even date herewith and entitled "Nitrogen Compounds and Preparation of Same," the classes of amines which react with tetracyanoethylene to give N-tricyanovinyl derivatives as the predominant products, are shown. The dividing line is distinct but not absolute, as will be seen in the following examples in which certain amines from the above classes which react with tetracyanoethylene to give preponderantly the expected C-tricyanovinyl derivatives at the same time yield minor proportions of N-tricyanovinyl derivatives.

The instant process can be carried out under mild conditions. Room temperature (about 25° C.) can be used although for more practical yields in a minimum period, it is preferred to operate at temperatures of at least about 50° C. Pressure is not critical and normally the process will be carried out at substantially atmospheric pressure. It is convenient to carry out the reaction in the presence of an organic liquid inert to the reactants and capable of dissolving tetracyanoethylene. The use of such a solvent facilitates bringing the reactants together and controlling the temperature of reaction. Relatively low boiling solvents such as tetrahydrofuran, benzene, alcohol, and acetone, in which tetracyanoethylene is readily soluble, can be used as well as such solvents as chloroform and diethyl ether in which tetracyanoethylene is only sparingly soluble. However, the presence of a solvent is a convenience and is not fundamental to the chemistry of the reaction. For example, when the amine is a liquid at room temperature, such as N,N-dimethylaniline, tetracyanoethylene may be dissolved directly therein. The mixture is stirred and the heat of reaction is removed by appropriate cooling. Solid N,N-dimethyl-p-tricyanovinylaniline separates from the mixture.

Illustrating a preferred embodiment of carrying out the invention, an aromatic amine such as N-methylaniline is added slowly to a solution of tetracyanoethylene in tetrahydrofuran at room temperature. The reaction to form the C-tricyanovinyl derivative of the amine, i. e., N-methyl-p-tricyanovinylamine, starts immediately. To facilitate completion of the reaction, the mixture is heated to reflux at about 65° C. for a period of one hour or more and the tetrahydrofuran is then evaporated off. The crude N-methyl-p-tricyanovinylamine is then purified by washing and recrystallizing from a suitable organic solvent.

The following examples, in which all proportions are by weight unless otherwise stated, illustrate specific embodiments of the process of this invention.

All absorption and molecular extinction data shown herein were measured on a Cary Recording Spectrophotometer built by the Applied Physics Corporation of Pasadena, California. The terms used are explained by Brode, W. R., "Chemical Spectroscopy," John Wiley & Sons, New York, 1939, page 4.

Example I

A solution of 10 parts of tetracyanoethylene and 266 parts of pure tetrahydrofuran is prepared, and 12.8 parts of N-methylaniline is added dropwise. An intense blue color develops which darkens slightly, becoming purplish. The solvent is boiled off on a steam table leaving N-methyl-p-tricyanovinylaniline in the form of a crystalline, bright blue solid; weight, 20 parts. The crystalline solid is sparingly soluble in methanol and ethanol (bright burgundy solutions), and dyes filter paper red. Samples for analysis are recrystallized from methyl alcohol and dried at 80° C. in vacuo.

*Analysis.*—Calc. for $C_{12}H_8N_4$: C, 69.20; H, 3.9; N, 26.9. Found: C, 69.44, 69.17; H, 3.85, 3.87; N, 26.87, 26.88.

The infrared spectrum shows strong N–H absorption, indicating substitution on the ring. Strong absorption at 12.1 microns suggests para-disubstitution of the benzene nucleus. Bands for conjugate unsaturation and nitrile are prominent. The molecular extinction coefficient at 500 m$\mu$ is 33,250. The structure of the N-methylaniline derivative is thought to be:

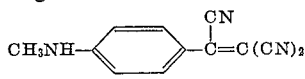

Example II

A solution of 10 parts of tetracyanoethylene in 178 parts of dry tetrahydrofuran is treated with 19.3 parts of N,N-dimethylaniline. A deep blue color forms immediately. The mixture is refluxed on a steam table, and the tetrahydrofuran is boiled off. The residue consists of N,N-dimethyl-p-tricyanovinylaniline in the form of a bright blue crystalline solid, weight 16 parts, sparingly soluble in ethyl alcohol. The solid is washed by suspension with 143 parts of diethyl ether and recrystallized from ethyl alcohol.

*Analysis.*—Calc. for $C_{13}H_{10}N_4$: C, 70.2; H, 4.54; N, 25.2. Found: C, 70.40, 70.21; H, 4.60, 4.42; N, 24.97, 25.25.

Elemental analyses agree with theory for the product of 1 mole of tetracyanoethylene and 1 mole of amine minus minus hydrogen cyanide. Infrared analysis indicates a disubstituted benzene, probably para. The molecular extinction coefficient in the visible at peak absorption (515 millimicrons) is 33,750. The probable structure is:

By substituting m-hydroxy-N,N-dimethylaniline for the N,N-dimethylaniline above, there is obtained N,N-dimethyl-m-hydroxy-p-tricyanovinylaniline.

Example III

To 50 parts of tetracyanoethylene in 266 parts of tetrahydrofuran is added slowly 50 parts of 2,6-dimethyl- aniline. The mixture is refluxed six hours and evaporated to dryness on the steam table under a jet of air. The residue is very sparingly soluble in ethanol and acetic acid. When collected on a filter, washed with hot acetic acid, and dried, the residue comprising 2,6-dimethyl-4-tricyanovinylaniline weighs 45 parts (52% yield). A sample after two recrystallizations from nitromethane melts at 288–9° C. and is a brilliant dark blue.

*Analysis.*—Calc. for $C_{13}H_{10}N_4$: C, 70.2; H, 4.54; N, 25.2. Found: C, 70.43, 70.18; H, 4.81, 4.60; N, 25.69, 25.71. UV: $\epsilon_{M500\ m\mu}=28,000$.

Some absorption occurs at 370 m$\mu$, probably due to a minor amount of N-substituted product.

A portion of the 2,6-dimethyl-4-tricyanovinylaniline is recrystallized from acetic acid, dried, and analyzed.

*Analysis.*—Found: N, 25.04, 24.92.
UV: $\epsilon_{M500\ m\mu}=35,500$.

Example IV

A solution of 128 parts of tetracyanoethylene and 89 parts of N-methyl pyrrole in 475 parts of acetone is allowed to stand at room temperature for 30 minutes and is then poured into 2500 parts of water. After the black oil which precipitates has solidified, it is removed by filtration, dissolved in acetic acid, treated with Darco, and filtered. The filtrate is diluted with water, and the greenish-yellow precipitate is recrystallized from dimethylformamide and washed with ether. There is obtained 130 parts (72% yield) of 1-methyl-2-tricyanovinylpyrrole in the form of a bright yellow crystalline material, M. P. 182–183° C. A sample is recrystallized from alcohol for analysis.

*Analysis.*—Calc. for $C_{10}H_6N_4$: C, 65.92; H, 3.24; N, 30.85. Found: C, 65.89, 65.96; H, 3.33, 3.35; N, 30.89, 30.98. UV: $\epsilon_{M388\ m\mu}=18,200$.

The most probable structure for this compound is believed to be:

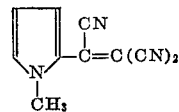

Example V

A solution of 128 parts of tetracyanoethylene and 67 parts of pyrrole in 475 parts of acetone is allowed to stand at room temperature for one hour. The reaction mixture is poured into 10,000 parts of water. The precipitate which forms is recrystallized from alcohol (Darco) and then from ethyl acetate (Darco). There is obtained 75 parts (45% yield) of 2-tricyanovinylpyrrole in the form of a yellow-orange crystalline material which melts at 211–213° C. with some decomposition starting at 205° C. The compound is soluble in 10% sodium hydroxide and is precipitated unchanged with dilute acid. This probably indicates a relatively acidic hydrogen.

*Analysis.*—Calc. for $C_9H_4N_4$: C, 64.28; H, 2.40; N, 33.32. Found: C, 64.19, 64.33; H, 2.48, 2.52; N, 33.33, 33.21.

The infrared spectrum has an absorption at 3.0$\mu$ for a N–H bond, indicating that the substitution is on a ring carbon rather than on the nitrogen. The visible absorption maximum is at 428 m$\mu$ ($\epsilon_M=25,700$). Some absorption occurs at 275 m$\mu$, which might be due to a minor amount of the N-substituted product.

These facts are in agreement with the following structure:

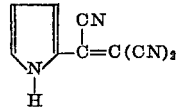

Example VI

N-methyl-N-(beta-cyanoethyl)aniline, 56 parts, is added slowly to 50 parts of tetracyanoethylene in 444 parts of tetrahydrofuran. The solution is refluxed 18 hours, and the solvent is removed on a steam table. There remains a dark red tar. A small amount of crystalline material is obtained by dissolving the residue in acetic acid and adding water. The suspended solid is decanted from a larger quantity of tar which "oils" out and is collected on a filter. The product is identified as N-methyl-N-(beta-cyanoethyl)-p-tricyanovinylaniline (weight 18 parts, 18% yield), M. P. 159–60° C. (preheated block).

*Analysis.*—Calc. for $C_{15}H_{11}N_5$: C, 68.9; H, 4.2; N, 26.8. Found: C, 68.74, 68.41; H, 4.41, 4.34; N, 26.88, 26.77. UV: $\epsilon_{M498\,m\mu}=30,500$.

The analytical data are consistent with the structure:

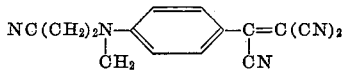

Example VII

To 50 parts of tetracyanoethylene dissolved in 444 parts of tetrahydrofuran is added 71 parts of N-butyl-N-(beta-cyanoethyl)aniline. The reaction mixture is refluxed for 18 hours, and the solvent is removed on the steam table. The residue is triturated with hot ethanol until it is largely dissolved and stirred until cool. The crystalline N-butyl-N-(beta-cyanoethyl)-p-tricyanovinylaniline which separates is collected on a filter and dried (weight, 52 parts; 44% yield), M. P. 128–9° C. (preheated block).

*Analysis.*—Calc. for $C_{18}H_{17}N_5$: N, 23.1. Found: N, 25.77, 25.08. UV: $\epsilon_{M505\,m\mu}=23,000$.

The absorption in the visible consists of a single peak with the maximum at 505 m$\mu$ indicated. Although the compound is not obtained analytically pure, a single colored substance is present. On the basis of molecular extinctions normally observed for:

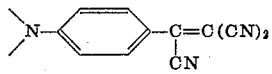

$\epsilon_M = 35,000$ (approx.)

this material is about 66%:

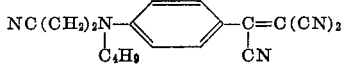

Example VIII

To 50 parts of tetracyanoethylene and 444 parts of tetrahydrofuran is added 50 parts of tetrahydroquinoline. The reaction mixture is refluxed 8 hours. Solvent is removed on the steam table, and the solid residue is dissolved in 790 parts of alcohol. Water is added slowly to precipitate the dye, and the solid 6-tricyanovinyl-1,2,3,4-tetrahydroquinoline is collected on a filter and dried (weight 65 parts, 73% yield). A sample pulverized and dried in vacuo is analyzed, M. P. 187° C. (preheated block).

*Analysis.*—Calc. for $C_{14}H_{10}N_4$: N, 23.9. Found: N, 26.06, 25.87. UV: $\epsilon_{M525\,m\mu}=24,300$.

Visible absorption contains a single peak. The estimated purity is 70%. The analyses are in accord with the structure:

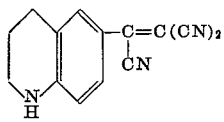

Example IX

Diphenylamine, 70 parts, and tetracyanoethylene, 50 parts, are dissolved in 178 parts of tetrahydrofuran, and the solution is refluxed 18 hours. The solvent is removed on the steam table, and the residue is heated at 100° C. for about one hour until crystallization commences. The residue is triturated with 714 parts of ether, and the suspended solid N-phenyl-p-tricyanovinylaniline is collected on the filter (weight, 63 parts; 59% yield), M. P. 157–8° C. (preheated block).

*Analysis.*—Calc. for $C_{17}H_{11}N_4$: C, 75.5; H, 3.7; N, 20.7. Found: C, 75.89, 75.11; H, 3.55, 3.60; N, 21.14, 21.04. UV: $\epsilon_{M512\,m\mu}=33,500$.

The above example is repeated and the product displays a molecular extinction of 37,000. The analytical data are in accord with the structure:

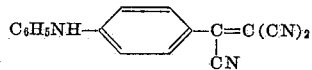

By substituting m-hydroxydiphenylamine for the diphenylamine above, there is obtained N-phenyl-m-hydroxy-p-tricyanovinylaniline.

Example X

To 50 parts of tetracyanoethylene in 266 parts of tetrahydrofuran is added 55 parts of N-phenylethanolamine. The solution is refluxed 8 hours and evaporated at room temperature. The crystalline residue is slurried with cold ethanol and filtered to give a somewhat tacky solid. The solid is dissolved in hot acetic acid, precipitated with ether, collected on a filter, and dried. The red-brown N-(p-tricyanovinylphenyl)ethanolamine product weighs 40 parts (43% yield), M. P. 162–3° C. (preheated block).

*Analysis.*—Calc. for $C_{13}H_{10}N_4O$: N, 23.5. Found: N, 23.22, 23.55. UV: $\epsilon_M\,502\,m\mu=32,600$.

The analytical data are consistent with the structure:

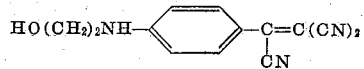

Example XI

To 50 parts of tetracyanoethylene in 266 parts of tetrahydrofuran is added 58 parts of N-(beta-cyanoethyl) aniline, and the solution is refluxed four hours. Solvent is evaporated off in a crystallizing dish at room temperature leaving a tar which crystallizes after standing several days. The mixture is suspended in about 560 parts of 1/4 acetic acid/diethyl ether, stirred at room temperature for a few minutes, cooled, and filtered. A small amount of solid (5.5 parts, 6% yield) is obtained, M. P. 140° C. The filtrate and ether washes are combined and evaporated to near dryness. The viscous residue is warmed to about 40° C. for about 20 hours, whereupon considerable material crystallizes. The residue is triturated with ether containing about 5% (volume) acetic acid and filtered. The crystals of N-(beta-cyanoethyl)-p-tricyanovinylaniline are washed with ether and dried (33.5 parts, 35% yield), M. P. 131–2° C.

*Analysis.*—Calcd. for $C_{14}H_9N_5$: N, 28.3. Found: N, 29.01, 28.75. UV: $\epsilon_{M487\,m\mu}=32,900$.

The analytical data are in accord with the structure:

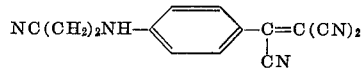

Example XII

Tetracyanoethylene, 42 parts, N-(beta-cyanoethyl)-o-toluidine, 53 parts, and 266 parts of dry tetrahydrofuran are mixed and refluxed 8 hours. The solution is poured into an evaporating dish, and the solvent is removed with a gentle stream of air (room temperature). The residual tar partially solidifies on standing overnight and is triturated with 300 parts of acetic acid. Diethyl ether, 715 parts, is added. The mixture is cooled to 0° C. and filtered. The solid N-(beta-cyanoethyl)-o-methyl-p-tricyanovinylaniline is then washed on the filter with cold diethyl ether/acetic acid and dried (weight 37.8 parts, 44% yield), M. P. 161–2° C. (preheated block).

*Analysis.*—Calc. for $C_{15}H_4N_5$: N, 26.8. Found: N, 29.13, 29.25. UV: $\epsilon_M\,485\,m\mu=30,300$.

The analytical data are in accord with the structure:

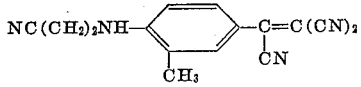

It will be understood that the above examples are merely illustrative and that the invention broadly comprises the process of reacting tetracyanoethylene with amines of the classes defined to form C-tricyanovinylamines.

The examples illustrate the mild conditions under which the reaction of the invention takes place. No temperature higher than that produced by refluxing tetrahydrofuran (B. P. 65° C.) is normally required but any temperature up to the decomposition temperature of the reactants and product can be used. While time affects the degree of completion of the reaction, it is not otherwise critical.

The C-tricyanovinylamines are potent sources of hydrogen cyanide and as such are highly useful as insecticides. When heated with moist alkali as in processes adaptable for fumigation, the C-tricyanovinylamines generate hydrogen cyanide rapidly. When deposited from a faintly alkaline medium (pH 7 to 9) as by spraying of plants or in insect nests, the C-tricyanovinylamines decompose slowly and give off hydrogen cyanide, thereby serving as effective insect poisons for extended periods of time.

The C-tricyanovinylamines formed by the process of this invention, are characterized by strong absorption of light. They absorb strongly in the visible spectrum and are in the main deep red in color, with maximum absorption at about 500 m$\mu$ and molecular extinctions of the order of 35,000. They are surprisingly effective as dyes for textile materials when applied from neutral or acid media, particularly when used to dye "Orlon" acrylic fiber and "Dacron" polyester fiber.

The use of these C-tricyanovinylamines as dyes is shown by the following:

A solution of 3 parts of N,N-dimethyl-4-tricyanovinylaniline in 50 parts of dimethylformamide is added to a boiling solution of 10 parts of sodium lauryl sulfate in 1000 parts of distilled water. This mixture is heated and stirred at 90–95° C. until a uniform dispersion is obtained. Skeins of cellulose acetate fibers are soaked and stirred in this mixture for 15 minutes. The skeins are washed exhaustively with hot water and dried. This treatment imparts a bright red, light-fast color to the cellulose acetate.

As many apparently widely different embodiments of this invention may be made without departing from the spirit and scope thereof, it is to be understood that the invention is not limited to the specific embodiments thereof except as defined in the appended claims.

The invention claimed is:

1. Process of preparing a C-tricyanovinylamine which comprises reacting tetracyanoethylene with a compound from the group consisting of primary aromatic amines in which neither annular carbon adjacent the carbon bonded to the amino substituent, is bonded to a member from the group consisting of hydrogen and halogen, and in which hydrogen is bonded to the annular carbon in the 4-position; secondary and tertiary aromatic amines in which hydrogen is bonded to the annular carbon in the 4-position; and heterocyclic amines in which the ring is resonance stabilized and contains at least one carbon bonded to hydrogen and in which only two bonds of the nitrogen are attached to the ring.

2. Process of preparing a C-tricyanovinylamine as set forth in claim 1 wherein said reaction is carried out in the presence of an organic liquid inert to the reactants and capable of dissolving tetracyanoethylene.

3. Process of preparing a C-tricyanovinylamine as set forth in claim 2 wherein said reaction is carried out at a temperature of at least 50° C.

4. Process of preparing a C-tricyanovinylamine as set forth in claim 1 wherein said reaction is carried out in the presence of tetrahydrofuran and at a temperature between about 50° C. and the boiling point of said tetrahydrofuran.

No references cited.